United States Patent
Chang et al.

(10) Patent No.: US 9,519,390 B2
(45) Date of Patent: Dec. 13, 2016

(54) SINGLE ELECTRODE LAYER OF TOUCH PANEL

(71) Applicant: GIANTPLUS TECHNOLOGY CO., LTD., Miao-Li County (TW)

(72) Inventors: Yu-Cheng Chang, Miao-Li County (TW); Kai-Dun Chang, Miao-Li County (TW)

(73) Assignee: Giantplus Technology Co., Ltd., Miao-Li (TW)

( * ) Notice: Subject to any disclaimer, the term of this patent is extended or adjusted under 35 U.S.C. 154(b) by 0 days.

(21) Appl. No.: 14/535,425

(22) Filed: Nov. 7, 2014

(65) Prior Publication Data

US 2015/0363031 A1   Dec. 17, 2015

(30) Foreign Application Priority Data

Jun. 13, 2014 (TW) .............................. 103120466 A

(51) Int. Cl.
  *G06F 3/041* (2006.01)
  *G06F 3/044* (2006.01)
(52) U.S. Cl.
  CPC ..................................... *G06F 3/044* (2013.01)
(58) Field of Classification Search
  CPC .................................................... G06F 3/0412
  See application file for complete search history.

(56) References Cited

U.S. PATENT DOCUMENTS

| 2014/0092036 A1 | 4/2014 | Lin et al. | |
| 2015/0177878 A1* | 6/2015 | Cheng | G06F 3/044 345/174 |
| 2015/0206501 A1* | 7/2015 | Kurasawa | G09G 3/2092 345/206 |

FOREIGN PATENT DOCUMENTS

| CN | 202771407 U | 3/2013 |
| TW | I474235 B | 2/2015 |

* cited by examiner

*Primary Examiner* — Kathy Wang-Hurst
*Assistant Examiner* — Peijie Shen
(74) *Attorney, Agent, or Firm* — Rosenberg, Klein & Lee

(57) ABSTRACT

The present invention provides a single electrode layer of a touch panel, which comprises a plurality of electrodes. The electrodes comprise a plurality of holes arranged in a plurality of rows in a first direction and adjacent to one another. The holes are also arranged in a plurality of columns in a second direction and adjacent to one another. The columns of the holes are arranged in a zigzag pattern along the first direction. The rows of the holes are arranged in a zigzag pattern along the second direction. The electrodes are arranged in a zigzag pattern along the first direction corresponding to the holes and forming a first side and a second side opposing to the first side, which are zigzag shape. The first and second sides form a plurality of convex parts and a plurality of concave parts. The geometric shapes of the convex parts and the concave parts extend the zigzag shapes of the holes along the second direction.

9 Claims, 2 Drawing Sheets

SINGLE ELECTRODE LAYER OF TOUCH PANEL

FIELD OF THE INVENTION

The present invention relates generally to a single electrode layer of a touch panel, and particularly to a single electrode layer of a touch panel capable of solving the problem of pattern visibility.

BACKGROUND OF THE INVENTION

Due to the advancement of touch panel technology, the fabrication technology of touch panels develops toward the trend of integrating into the process for thin film transistor LCD (TFTLCD) as a touch display module to reduce the manufacturing cost and the thickness of a touch panel. For meeting the above requirements, developers have developed the technology of single electrode layer of touch panel. By using the processes such as exposure, developing, and etching to fabricate the transmitting electrodes ($T_X$), the receiving electrodes ($R_X$), and the wires for transmitting and receiving signals.

Nonetheless, a general single electrode layer touch panel includes many transmitting electrodes, receiving electrodes, and wires for transmitting and receiving signals. For example, a general 5-inch single electrode layer touch panel needs to include 352 wires for transmitting signals. In addition, the wires for transmitting signals are straight. Consequently, when the touch panel is placed on the display panel, the phenomenon of pattern visibility occurs. In other words, when a user views the display panel from some certain angles, he/she will find many straight stripes caused by wiring of the touch panel. Moreover, there are massive transmitting electrodes and receiving electrodes disposed nearby. Thereby, the transmitting electrodes and receiving electrodes will also result in the phenomenon of pattern visibility.

Accordingly, the present invention provides a single electrode layer of touch panel for solving the problem of pattern visibility in a single electrode layer touch panel as described above.

SUMMARY

An objective of the present invention is to provide a single electrode layer of touch panel. A plurality of electrodes comprise a plurality of holes. By using the geometric shapes of the electrodes and the holes, the problem of pattern visibility can be solved.

Another objective of the present invention is to provide a single electrode layer of touch panel. A plurality of virtual electrodes are used for solving the problem of pattern visibility.

In order to achieve the above objectives, the present invention provides a single electrode layer of touch panel. The touch panel comprises a substrate, a plurality of transmission lines, and a plurality of electrodes. The transmission lines and the electrodes are disposed on the substrate. The electrodes are disposed adjacent to one another and connected electrically to the transmission lines. The electrodes comprise a plurality of holes arranged in a plurality of rows in a first direction and adjacent to one another. The holes are also arranged in a plurality of columns in a second direction and adjacent to one another. The columns of the holes are arranged in a zigzag pattern along the first direction. The rows of the holes are arranged in a zigzag pattern along the second direction. The electrodes are corresponded to the holes arranged in a zigzag pattern along the first direction to form a first side and a second side opposing to the first side, which are zigzag shape. The first and second sides form a plurality of convex parts and a plurality of concave parts. The geometric shapes of the convex parts and the concave parts extend the zigzag pattern of the holes along the second direction.

In addition, the single electrode layer of touch panel according to the present invention further comprises a plurality of virtual electrodes disposed among the electrodes. Moreover, the virtual electrodes extend the zigzag shape of the convex parts and appear zigzag.

DETAILED DESCRIPTION

In order to make the structure and characteristics as well as the effectiveness of the present invention to be further understood and recognized, the detailed description of the present invention is provided as follows along with embodiments and accompanying figures.

Figure 1:
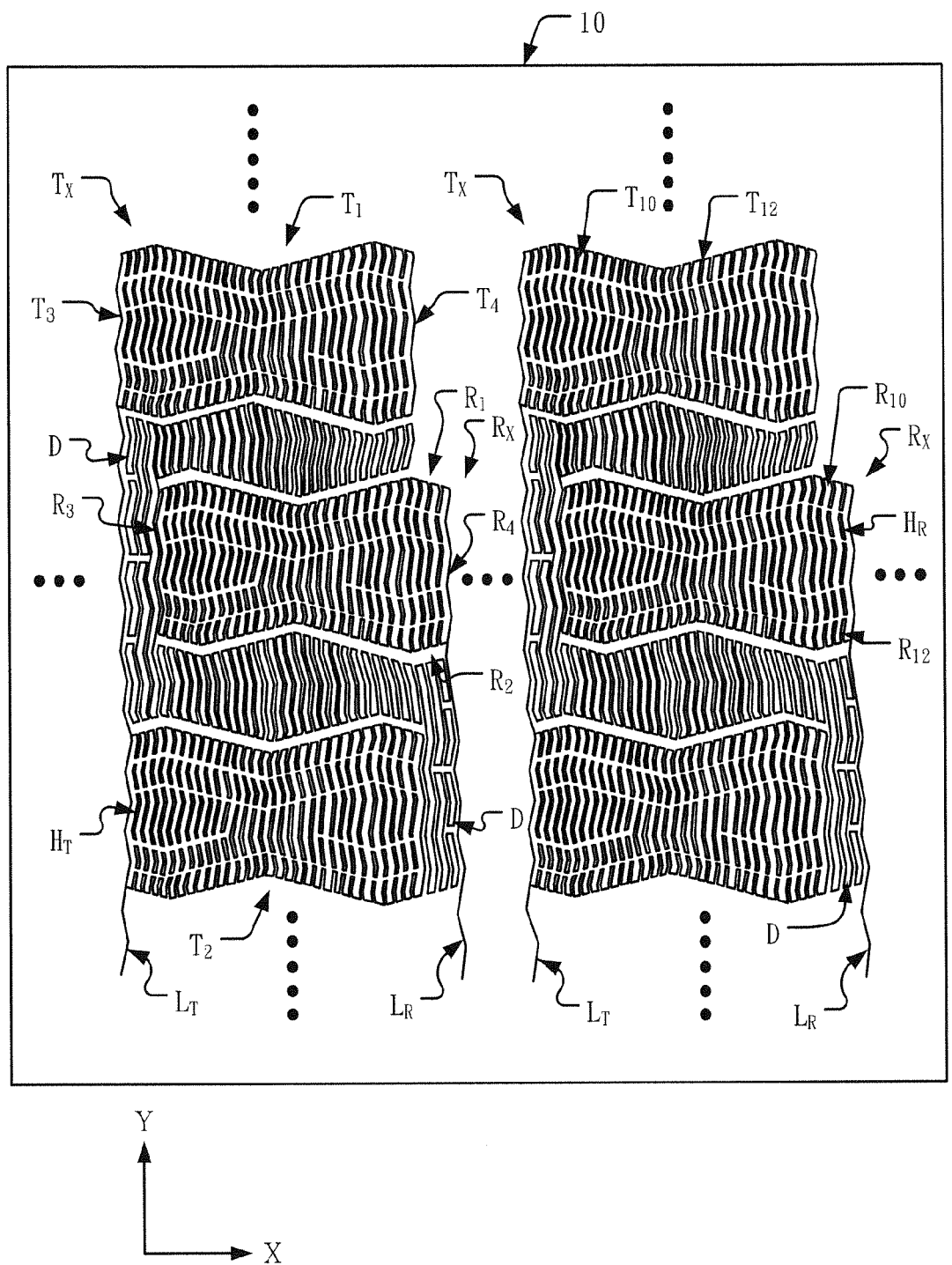
FIG. 1 shows a schematic diagram of the single electrode layer of touch panel according to an embodiment of the present invention.

Please refer to FIG. 1, which shows a schematic diagram of the single electrode layer of touch panel according to an embodiment of the present invention. As shown in the figure, the present invention provides a single electrode layer of touch panel. The touch panel comprises a substrate 10, a plurality of transmission lines $L_T$, $L_R$ and a plurality of electrodes $T_X$, $R_X$ disposed on the substrate 10. The electrodes $T_X$, $R_X$ are disposed adjacent to one another and connected electrically to the transmission lines $L_T$, $L_R$. The electrodes $T_X$, $R_X$ comprise a plurality of holes $H_T$, $H_R$ arranged in adjacent a plurality of rows in a first direction X. The holes $H_T$, $H_R$ are arranged in adjacent a plurality of columns in a second direction Y. The columns of the holes $H_T$, $H_R$ are arranged in a zigzag pattern along the first direction X. The rows of the holes $H_T$, $H_R$ are formed a zigzag shape along the second direction Y. The electrodes $T_X$, $R_X$ are corresponded to the holes $H_T$, $H_R$ arranged in a zigzag pattern along the first direction X to form a first side $T_1$, $R_1$ and a second side $T_2$, $R_2$ opposing to the first side $T_1$, $R_1$, which are zigzag shape. The first side $T_1$, $R_1$ and the second side $T_2$, $R_2$ form a plurality of convex parts $T_{10}$, $R_{10}$ and a plurality of concave parts $T_{12}$, $R_{12}$. The geometric shapes of the convex parts $T_{10}$, $R_{10}$ and the concave parts $T_{12}$, $R_{12}$ extend the zigzag pattern of the holes $H_T$, $H_R$ along the second direction Y.

Figure 2:
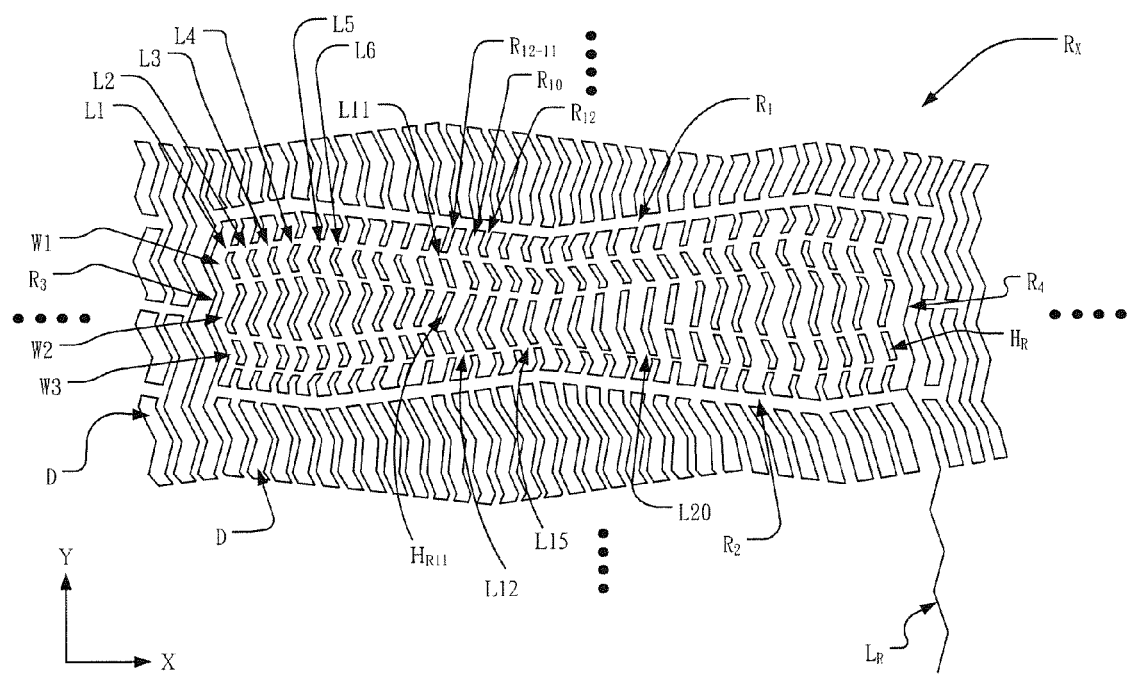
FIG. 2 shows the receiving electrodes of the touch panel according to an embodiment of the present invention.

Please refer to FIG. 1 again. The electrodes $T_X$, $R_X$ are touch electrodes such as a plurality of transmitting electrodes $T_X$ and a plurality of receiving electrodes $R_X$ of the touch panel. A transmitting electrode $T_X$ and a receiving electrode $R_X$ can form a sensing unit and be applied to the touch operations of sensing the touch panel. In order to solve the problem of pattern visibility, the geometric shapes of the electrodes $T_X$, $R_X$ are designed according to the present embodiment. The embodiment of the geometric shapes is shown in FIG. 2, which shows the receiving electrode $R_X$ of the touch panel according to an embodiment of the present invention. As shown in the figure, one of the electrodes $T_X$, $R_X$, such as the receiving electrode $R_X$, is taken as an example; the geometric shape of the transmitting electrode $T_X$ is the same as that of the receiving electrode $R_X$. The receiving electrodes $R_X$ comprise the holes $H_R$. The holes $H_R$ are arranged in a plurality of rows along the first direction X; the holes $H_R$ are arranged in a plurality of columns along the second direction Y. The holes $H_R$ in each row are arranged adjacent to one another; the holes $H_R$ in each column are arranged adjacent to one another as well. In other words, the holes $H_R$ are arranged in the rows adjacent to one another along the first direction X; the holes $H_R$ are arranged in the columns adjacent to one another along the second direction Y.

The most left column of the columns of the holes $H_R$ is the first column L1. Along the first direction X, the locations of the holes $H_R$ on the first column L1 near the first side $R_1$ of the receiving electrode $R_X$ are lower than the locations of the holes $H_R$ on the second column L2. The locations of the holes $H_R$ on the second column L2 are lower than the locations of the holes $H_R$ on the third column L3, and so forth. Nonetheless, in order to appear the zigzag pattern by the top edge of the holes $H_R$ on the top of the columns after forming the holes of the columns, the locations of the holes $H_R$ on the fifth column L5 are lower than the locations of the holes $H_R$ on the fourth column L4. The locations of the holes $H_R$ on the sixth column L6 are lower than the locations of the holes $H_R$ on the fifth column L5, and so forth. Thereby, the zigzag pattern formed by arranging the holes of the columns appears that the holes $H_R$ are formed an upward trend from the top of the first column L1 to the top of the fourth column L4. While the holes $H_R$ are form a downward trend from the top of the fourth column L4 to the top of the fifteenth column L15. Then the holes $H_R$ are formed the upward and downward trends alternately in subsequent arrange. The angle of the upward trend differs from that of the downward trend by approximately 15 degrees. In other words, the columns of the holes $H_R$ are arranged in a zigzag pattern along the first direction X.

Besides, the zigzag pattern is formed in the first direction X and formed by arranging the holes of the columns $H_R$ near the second side $R_2$ of the receiving electrode $R_X$, which appears the holes $H_R$ form a downward trend from the bottom of the first column L1 to the bottom of the fourth column L4. While the holes $H_R$ are formed an upward trend from the bottom of the fourth column L4 to the bottom of the fifteenth column L15. Then the holes $H_R$ are formed the downward and upward trends alternately in subsequent arrangement. Thereby, the holes $H_R$ adjacent to the first side $R_1$ and the second side $R_2$ of the receiving electrode $R_X$ are formed zigzag pattern in different trends. Nonetheless, the holes arranged in the bottom of the columns adjacent to the second side $R_2$ of the receiving electrode $R_X$ can also be formed first by an upward trend and then by a downward trend, just like the holes arranged in the top of the columns adjacent to the first side $R_1$ of the receiving electrode $R_X$. Accordingly, the present embodiment does not limit how the holes $H_R$ are arranged into the columns and in a zigzag pattern. In addition, in each column, the holes $H_R$ between the hole $H_R$ on the top of the columns and the hole $H_R$ on the bottom of the columns are also formed the zigzag pattern of a column arrangement.

Furthermore, in the second direction Y, the top row of the holes $H_R$ is the first row W1. The hole $H_R$ of the left of the first row W1 can be zigzag shape; the hole $H_R$ of the left of the second row W2 and the hole $H_R$ of the left of the third row W3 can be zigzag shape as well. Thereby, after the holes $H_R$ of the left of the first row W1 to the third row W3 are formed, they form a zigzag pattern along the second direction Y. Nonetheless, the zigzag shape formed by the holes $H_R$ of each row along the second direction Y can be formed by another method. For example, the hole $H_{11}$ of the eleventh of the first row W1 and the hole $H_{R11}$ of the eleventh of the second row W2 are not zigzag shape. Nevertheless, after the hole $H_{R11}$ of the eleventh of the first row W1 is formed at a slope, the hole $H_{R11}$ of the eleventh of the second row W2, following the hole $H_{R11}$ of the eleventh of the first row W1, is formed at an slope. Afterwards, the hole $H_{R11}$ of the eleventh of the third row W3, following the hole $H_{R11}$ of the eleventh of the second row W2, is also formed at an slope. Thereby, after the holes $H_{R11}$ of the eleventh of the first row W1 to the third row W3 are formed, they form a zigzag pattern along the second direction Y. Consequently, after the holes $H_R$ of each row in the second direction Y are formed, similar to the first direction X, they form a zigzag shape. In other words, the rows of the holes $H_R$ are arranged in the zigzag shape along the second direction Y. In addition, the first direction X is perpendicular to the second direction Y.

Please refer again to FIG. 2. After the columns of the holes $H_R$ are formed, the hole number, as the number of the holes $H_R$, in each column is different. For example, the hole number of the holes $H_R$ from the first column L1 to the eleventh column L11 is three, respectively; the hole number of the holes $H_R$ from the twelfth column L12 to the twentieth column L20 is two, respectively; then, the hole number of the holes $H_R$ for the subsequent columns is increased back to three, respectively. Thereby, the hole number of the holes $H_R$ arranged in the columns is decreased first and then increased along the first direction X. Contrarily, the hole number of the holes $H_R$ arranged in the columns can be increased first and then decreased along the first direction X. Consequently, according to the two designs described above, after the holes $H_R$ arranged in the columns are formed, the hole number of the holes changes according to the zigzag shape along the first direction X. By designing the holes $H_R$ according to the present embodiment, the pattern visibility problem produced by the holes $H_R$ can be solved.

The receiving electrode $R_X$ has a first side $R_1$, a second side $R_2$, a third side $R_3$, and a fourth side $R_4$. The second side $R_2$ is opposing to the first side $R_1$; the third side $R_3$ is opposing to the fourth side $R_4$. In addition, the third side $R_3$ and the fourth side $R_4$ are connected between the first side $R_1$ and the second side $R_2$. The columns of the holes $H_R$ adjacent to the first side $R_1$ of the receiving electrode $R_X$ are arranged in a zigzag pattern along the first direction X. Thereby, the geometric shape of the first side $R_1$ of the receiving electrode $R_X$ corresponds to the zigzag arrangement of the columns of the holes $H_R$ and is zigzag shape as well. Likewise, the columns of the holes $H_R$ adjacent to the second side $R_2$ of the receiving electrode $R_X$ are arranged in a zigzag pattern along the first direction X. Thereby, the geometric shape of the second side $R_2$ of the receiving electrode $R_X$ corresponds to the zigzag arrangement of the columns of the holes $H_R$ and is zigzag shape as well. In other words, the electrodes $R_X$ are corresponded to the holes $H_R$ arranged in a zigzag pattern along the first direction X to form the first side $R_1$ and the second side $R_2$ opposing to the first side $R_1$, which are zigzag shape.

Moreover, the holes $H_R$ adjacent to the third side $R_3$ of the receiving electrode $R_X$ are formed in a zigzag shape along the second direction Y. Thereby, the geometric shape of the third side $R_3$ of the receiving electrode $R_X$ corresponds to the zigzag shape of the holes $H_R$ and is zigzag shape as well. Likewise, the holes $H_R$ adjacent to the fourth side $R_4$ of the receiving electrode $R_X$ are formed in a zigzag shape along the second direction Y. Thereby, the geometric shape of the fourth side $R_4$ of the receiving electrode $R_X$ corresponds to the zigzag shape of the holes $H_R$ and is zigzag as well. In other words, the third side $R_3$ and the fourth side $R_4$ of the receiving electrodes $R_X$ are corresponding to the zigzag shape of the holes along the second direction Y and thus forming the zigzag shape.

The first side $R_1$ and the second side $R_2$ of the receiving electrode $R_X$ form a plurality of convex parts $R_{10}$ and a plurality of concave parts $R_{12}$ respectively, and each concave part $R_{12}$ is formed between two convex parts $R_{10}$. Besides, with formed in a zigzag shape along the second direction Y, the concave parts $R_{12}$ can be zigzag shape. It is shown in FIG. 2 that the zigzag shape of the concave parts $R_{12}$ extends the zigzag shape of the holes $H_R$ in the columns. Hence, the geometric shape of the concave parts $R_{12}$ extends the geometric shape of the holes $H_R$. In addition, in the second direction Y, the zigzag shape of the concave parts $R_{12}$ by extending the holes $H_R$ can be formed by another method. For example, the convex part $R_{12-11}$ of the eleventh of the convex part $R_{12}$ and the holes $H_R$ in the eleventh of the column L11 are not zigzag shape. Instead, by extending the holes $H_R$ of the eleventh of the column L11, the convex part $R_{12-11}$ of the eleventh of the convex part $R_{12}$ is formed at an slope and appears zigzag shape. Thereby, the geometric shape of the concave parts $R_{12}$ extends the zigzag shape of the holes $H_R$ along the second direction Y. In addition, the geometric shape of the of convex parts $R_{10}$, like the zigzag shape of the convex parts $R_{12}$, is also zigzag shape. Accordingly, the geometric shape of the convex parts $R_{10}$ also extends the zigzag shape of the holes $H_R$ along the second direction Y.

Please refer again to FIG. 1. The single electrode layer of touch panel according to the present invention further comprises a plurality of virtual electrodes D disposed between the electrodes $T_X$, $R_X$. For example, the virtual electrodes D are disposed between the transmitting electrodes $T_X$ and the receiving electrodes $R_X$. That is to say, the virtual electrodes D can be disposed one side of the transmitting electrodes $T_X$ and one side of the receiving electrodes $R_X$. Please refer again to FIG. 2. The virtual electrodes D are disposed on the first side $R_1$ of the receiving electrode $R_X$ extend the zigzag shape of the convex parts $R_{10}$ and are zigzag shape accordingly. Furthermore, the geometric shape of the convex parts $R_{10}$ extends the zigzag shape of the holes $H_R$. Thereby, corresponding to the zigzag shape of the holes $H_R$, the virtual electrodes D are zigzag shape as well. Likewise, the virtual electrodes D are disposed on the second side $R_2$ of the receiving electrode $R_X$ correspond to the zigzag shape of the holes $H_R$ and are zigzag shape as well.

Moreover, the virtual electrodes D are disposed on the third side $R_3$ of the receiving electrode $R_X$ correspond to the zigzag shape of the third side $R_3$ and are zigzag shape as well. Similarly, the virtual electrodes D are disposed on the fourth side $R_4$ of the receiving electrode $R_X$ correspond to the zigzag shape of the fourth side $R_4$ and are zigzag shape as well. In addition, the geometric shapes of the third and fourth sides $R_3$, $R_4$ of the receiving electrode $R_X$ correspond to the zigzag shape of the holes $H_R$ along the second direction Y. Thereby, corresponding to the zigzag shape of the holes $H_R$ along the second direction Y, the geometric shape of the virtual electrodes D are zigzag shape as well.

Please refer to FIG. 2. Along the reverse of the first direction X, the number of virtual electrodes on the third side $R_3$ of the receiving electrode $R_X$ changes from one virtual electrode D to two, and then to four virtual electrodes D. Thereby, the number of virtual electrodes on the third side $R_3$ of the receiving electrode $R_X$ is increased gradually along the reverse of the first direction X. Alternatively, the number of virtual electrodes on the third side $R_3$ of the receiving electrode $R_X$ can be decreased gradually along the reverse of the first direction X. Hence, the gradually increasing or decreasing number of virtual electrodes produces the gradual effect, which can improves the display quality. Likewise, along the first direction X, the number of virtual electrodes on the fourth side $R_4$ of the receiving electrode $R_X$ changes from four virtual electrodes D to two, and then to one virtual electrode D. Thereby, the number of virtual electrodes on the fourth side $R_4$ of the receiving electrode $R_X$ is decreased gradually along the first direction X. Alternatively, it also can be increased gradually along the first direction X.

Please refer again to FIG. 1. The geometric shape of the transmission lines $L_T$, $L_R$ according to the present embodiment can be designed the zigzag shape as well. Thereby, the path of the layout of the transmission lines $L_T$, $L_R$ is not straight. In addition, the transmission lines $L_T$, $L_R$, by extending the zigzag shape of the third side $R_3$ of the transmitting electrodes $T_X$ and the fourth side $R_4$ of the receiving electrodes $R_X$, are zigzag shape as well. Furthermore, corresponding to the zigzag shape of the holes $H_R$ along the second direction Y, the third side $R_3$ of the transmitting electrodes $T_X$ and the fourth side $R_4$ of the receiving electrodes $R_X$ are zigzag shape. Thereby, corresponding to the zigzag shape of the holes $H_R$ along the second direction Y, the transmission lines $L_T$, $L_R$ are zigzag shape.

To sum up, the present invention provides a single electrode layer of touch panel. The touch panel comprises a substrate, a plurality of transmission lines, and a plurality of electrodes. The transmission lines and the electrodes are disposed on the substrate. The electrodes are disposed adjacent to one another and connected electrically to the transmission lines. The electrodes comprise a plurality of holes arranged in a plurality of rows in a first direction and adjacent to one another. The holes are also arranged in a plurality of columns in a second direction and adjacent to one another. The columns of the holes are arranged in a zigzag pattern along the first direction. The rows of the holes are arranged in a zigzag pattern along the second direction. The electrodes are arranged in a zigzag pattern along the first direction corresponding to the holes and forming a first side and a second side opposing to the first side, which are zigzag shape. The first and second sides form a plurality of convex parts and a plurality of concave parts. The geometric shapes of the convex parts and the concave parts extend the zigzag shapes of the holes along the second direction.

Moreover, the single electrode layer of touch panel according to the present invention further comprises a plurality of virtual electrodes disposed among the electrodes. By extending the zigzag shape of the convex parts, the virtual electrodes are zigzag shape as well. Thereby, by designing the holes, the sides of the electrodes, the geometric shape of the virtual electrodes, and the number of the virtual electrodes D in a gradually increasing or/and decreasing way, the pattern visibility problem can be solved.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

The invention claimed is:

1. A single electrode layer of touch panel, comprising:
a plurality of transmission lines, disposed on a substrate; and
a plurality of electrodes, disposed on said substrate, disposed adjacent to one another and connected electrically to said transmission lines, comprising a plurality of holes, said holes arranged in a plurality of rows and adjacent to one another in a first direction, said holes arranged in a plurality of columns and adjacent to one another in a second direction, said columns of said holes arranged in a zigzag shape along said first direction, said rows of said holes formed in a zigzag shape along said second direction, said electrodes corresponded to the holes arranged in the zigzag pattern along the first direction to form a first side and a second side opposing to the first side, said first side and said second side formed the zigzag shape, said first side and said second side formed a plurality of convex parts and a plurality of concave parts, and the geometric shapes of said convex parts and said concave parts extending the zigzag shape of said holes along said second direction;
wherein said electrodes include a third side and a fourth side opposing to said third side and connected between said first side and said second side, and said third side and said fourth side are the zigzag shape corresponded to the zigzag shape of said holes along said second direction;
wherein the hole number of said holes arranged in said columns is first decreased and then increased or first increase and then decreased along said first direction.

2. The single electrode layer of touch panel of claim 1, and further comprising a plurality of virtual electrodes, disposed among said electrodes, and being zigzag shape corresponded to the zigzag shape of said holes.

3. The single electrode layer of touch panel of claim 2, wherein the number of virtual electrodes on said third side is increased gradually or decreased gradually along the reverse of first direction, and the number of virtual electrodes on said fourth side is decreased gradually or increased gradually along said first direction.

4. The single electrode layer of touch panel of claim 1, wherein each of said concave parts is formed between any two of said convex parts.

5. A single electrode layer of touch panel, comprising:
a plurality of transmission lines, disposed on a substrate; and
a plurality of electrodes, disposed on said substrate, disposed adjacent to one another and connected electrically to said transmission lines, comprising a plurality of holes, said holes arranged in a plurality of rows and adjacent to one another in a first direction, said holes arranged in a plurality of columns and adjacent to one another in a second direction, said columns of said holes arranged in a zigzag shape along said first direction, said rows of said holes formed in a zigzag shape along said second direction, said first direction being perpendicular to said second direction, said electrodes corresponded to the holes arranged in the zigzag pattern along the first direction to form a first side and a second side opposing to the first side, said first side and said second side formed the zigzag shape, said first side and said second side formed a plurality of convex parts and a plurality of concave parts, the geometric shapes of said convex parts and said concave parts extending the zigzag shape of said holes along said second direction, said electrodes including a third side and a fourth side opposing to said third side and connected between said first side and said second side, and said third side and said fourth side being zigzag corresponded to the zigzag shape of said holes along said second direction;
wherein the hole number of said holes arranged in said columns is first decreased and then increased or first increased and then decreased along said first direction.

6. The single electrode layer of touch panel of claim 5, wherein the path of the layout of said transmission lines on said substrate is not straight, and said transmission lines are zigzag shape by extending the zigzag shape of said third side and said fourth side.

7. The single electrode layer of touch panel of claim 5, and further comprising a plurality of virtual electrodes, disposed among said electrodes, and being zigzag shape corresponded to the zigzag shape of said holes.

8. The single electrode layer of touch panel of claim 7, wherein the number of virtual electrodes on said third side is increased gradually or decreased gradually along the reverse of first direction, and the number of virtual electrodes on said fourth side is decreased gradually or increased gradually along said first direction.

9. The single electrode layer of touch panel of claim 5, wherein each of said concave parts is formed between any two of said convex parts.

* * * * *